United States Patent [19]

Talbot

[11] Patent Number: 5,029,565
[45] Date of Patent: Jul. 9, 1991

[54] SPARK IGNITED INTERNAL COMBUSTION ENGINE AND A CONTROL SYSTEM THEREFOR

[75] Inventor: Kevin T. Talbot, Lichfield, England

[73] Assignee: Rover Group Limited, England

[21] Appl. No.: 507,651

[22] Filed: Apr. 9, 1990

[30] Foreign Application Priority Data

May 5, 1989 [GB] United Kingdom ............... 8910319

[51] Int. Cl.[5] ............. F02P 5/14; G01L 23/06; G01L 23/22
[52] U.S. Cl. ................................. 123/425; 123/435; 73/35
[58] Field of Search ............. 374/144; 123/425, 435; 73/350

[56] References Cited

U.S. PATENT DOCUMENTS

| | | | |
|---|---|---|---|
| 4,377,086 | 3/1983 | Linder et al. | 73/350 |
| 4,463,733 | 8/1984 | Tsai | 123/425 |
| 4,760,830 | 8/1988 | Bullis et al. | 123/425 |
| 4,919,099 | 4/1990 | Extance et al. | 123/435 |
| 4,930,478 | 6/1990 | Plee et al. | 123/435 |

FOREIGN PATENT DOCUMENTS

| | | | |
|---|---|---|---|
| 0170742 | 7/1989 | Japan | 123/425 |
| 2142436 | 1/1985 | United Kingdom | |
| 2186997 | 8/1987 | United Kingdom | |

Primary Examiner—Tony M. Argenbright
Assistant Examiner—Robert E. Mates
Attorney, Agent, or Firm—Davis, Bujold & Streck

[57] ABSTRACT

A spark ignited internal combustion engine is disclosed in which at least one of the inlet tracts of the engine has an optical knock sensor in the form of an infra-red temperature sensor located in it. The infra-red temperature sensor is positioned to sense by viewing past an inlet valve means associated with the respective inlet tract at least during part of the induction stroke of the respective cylinder of the engine the temperature of the upper surface of the respective piston. A control system for such an engine is also disclosed in which the output from the infra-red temperature sensor is supplied to an electronic control unit. The electronic control unit operates so as to adjust the ingition timing of the engine in response to the signal received from the infra-red temperature sensor.

8 Claims, 2 Drawing Sheets

SPARK IGNITED INTERNAL COMBUSTION ENGINE AND A CONTROL SYSTEM THEREFOR

FIELD OF INVENTION

This invention relates to a spark ignited internal combustion engine and a control system therefore and in particular to a means for sensing knock and to a control system for adjusting the ignition timing of the engine to reduce knock.

BACKGROUND OF THE INVENTION

Abnormal combustion or knock is disadvantageous in that it is audible to the driver at low engine speeds and reduces his perception of engine smoothness and also causes rapid destruction of the piston due to overheating if allowed to become excessive.

Knock can be reduced by retarding the ignition timing, enriching the fuel-air mixture or adjusting the exhaust gas recycling rate.

It is known to provide an accelerometer connected to the engine to listen for knock by sensing increased vibration.

Such a system is adequate at low engine speeds to reduce the noise audible to the driver but at higher engine speeds, when most damage is produced by knock, the ability of such accelerometer based systems to distinguish knock from the general increase in engine noise and vibration is greatly reduced.

OBJECT OF THE INVENTION

It is an object of this invention to overcome the disadvantages of the prior art.

SUMMARY OF THE INVENTION

According to a first aspect of the invention there is provided a spark ignited internal combustion engine having at least one inlet tract and a control system therefore the control system comprising an engine electronic control unit, an optical knock sensor located in at least one inlet tract of the engine to sense, at least during part of the induction stroke, the radiation passing by an inlet valve means associated with that inlet tract and to supply a signal indicative of the sensed temperature to the electronic control unit and an ignition system including at least one spark plug, a high voltage supply unit to supply a high voltage to the or each spark plug in response to a control signal from the electronic control unit and a crankshaft transducer means to supply signals indicative of the speed and rotational position of a crankshaft of the engine to the electronic control unit wherein the electronic control unit adjusts the ignition timing of the engine by varying the control signal in response to the signals received from the optical knock sensor and the crankshaft transducer means.

This has the advantage that the optical knock sensor is not subjected to high temperatures.

The optical knock sensor maybe a ceramic pyroelectric infra-red temperature sensor.

Preferably, the temperature sensed is indicative of the surface temperature of the upper surface of a piston of the engine.

This has the advantage that the actual cause of piston damage is directly sensed.

Preferably, the control system may further comprise an accelerometer knock sensor which supplies a signal to the electronic control unit indicative of knock, the electronic control unit using this signal in combination with the signals from the optical knock sensor and the crankshaft transducer means to determine the adjustment of ignition timing required.

This has the advantage that a more accurate prediction of knock can be obtained.

Preferably, the engine is a multi-cylinder engine and every inlet tract has an optical knock sensor associated with it.

This has the advantage that cylinder to cylinder temperature variations can be measured and the ignition timing adjusted to suit each individual cylinder.

According to a second aspect of the invention there is provided a spark ignited internal combustion engine comprising at least one cylinder the or each of which has a reciprocable piston associated with it, at least one inlet tract for the or each cylinder, and at least one exhaust tract for the or each cylinder, each inlet tract being selectively connectable to its respective cylinder by inlet valve means, wherein at least one of the inlet tracts has located in it a knock sensor in the form of an infra-red temperature sensor positioned to sense through the associated inlet valve means of that cylinder, at least during part of the induction stroke of that cylinder of the engine, the temperature of the upper surface of the respective piston.

This has the advantage that the optical knock sensor is not subjected to high temperatures.

Each infra-red sensor may be a ceramic pyroelectric sensor.

Advantageously, the engine is a multi-cylinder engine and every inlet tract has an infra-red sensor located in it.

This has the advantage that cylinder to cylinder temperature variations can be measured.

BRIEF DESCRIPTION OF THE DRAWING

The invention will now be described by way of example with reference to the accompanying drawing of which.

DESCRIPTION OF PREFERRED EMBODIMENT

Figure 1:
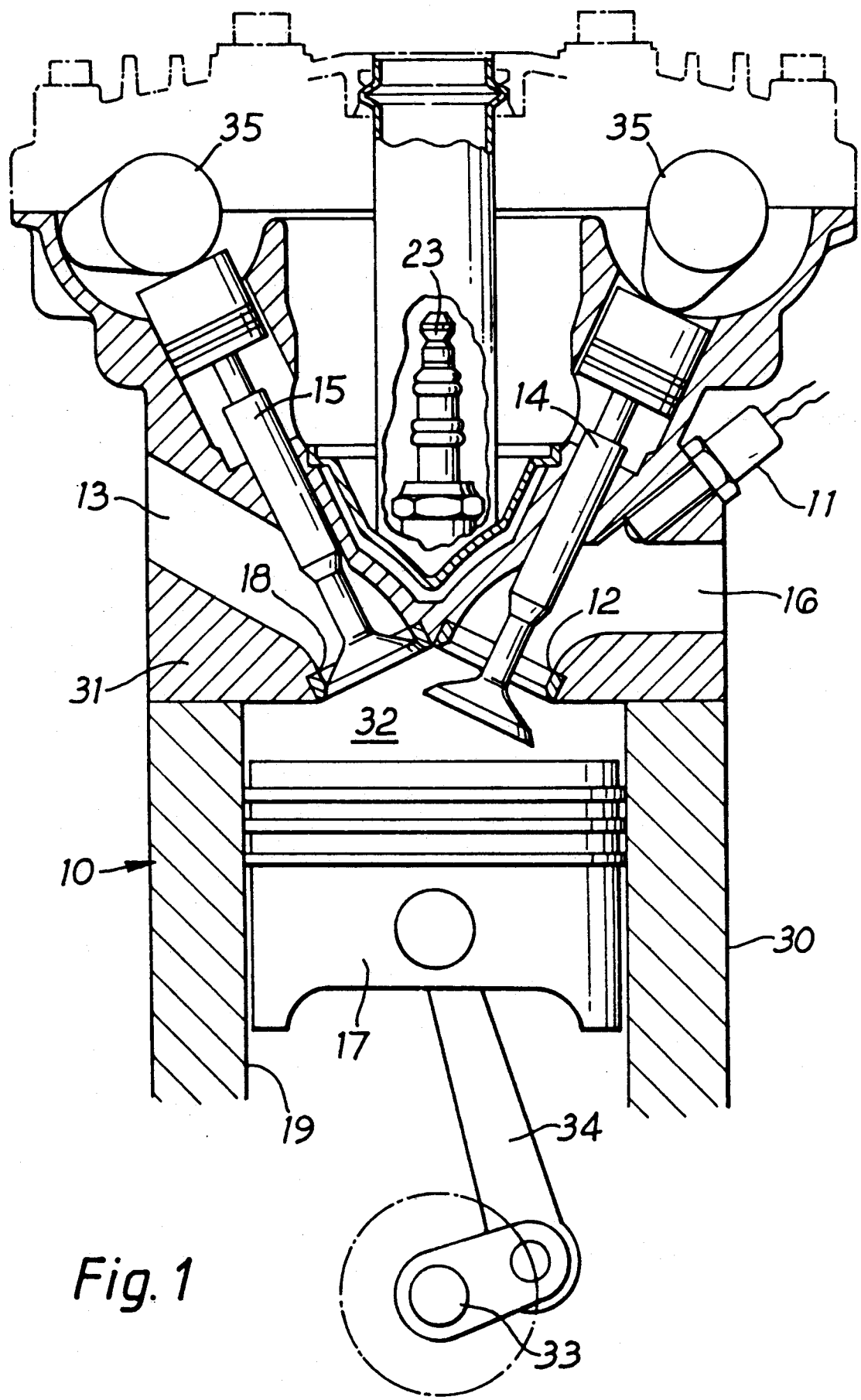
FIG. 1 is a schematic cross-section through a spark ignited engine according to the invention.
Figure 2:
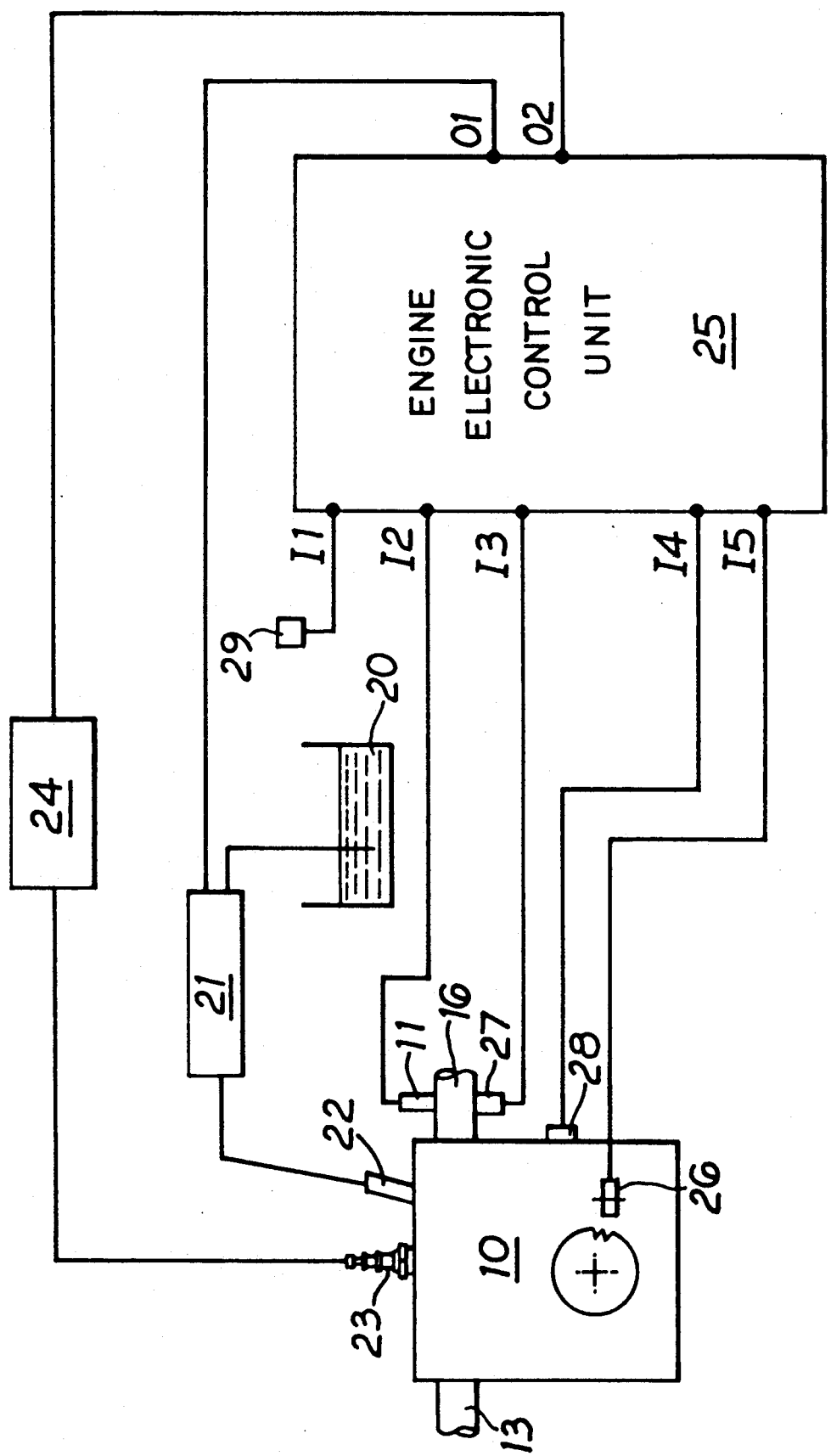
FIG. 2 is a block diagram of a spark ignited engine and a control system therefore according to the invention.

With reference to the figures there is shown a spark ignited internal combustion engine 10 having a cylinder block 30, a cylinder head 31, a piston 17 slidingly mounted in a cylinder 19 defined by said cylinder block 30 to define a variable volume combustion chamber 32.

The piston 17 is connected to a crankshaft 33 by means of a connecting rod 34.

The cylinder head 31 has a first passageway in it defining an exhaust tract 13 and a second passageway defining an inlet tract 16.

The exhaust tract 13 is connectable to the combustion chamber 32 through an exhaust port 18 and associated exhaust valve means 15.

The inlet tract 16 is connectable to the combustion chamber 32 through an inlet port 12 and associated inlet valve means 14. The valve means 14 and 15 are opened and closed by the valve lifting mechanism 35 in a predetermined sequence.

An optical knock sensor in the form of ceramic pyroelectric infra-red temperature sensor 11 is mounted in the inlet tract 16 adjacent to and facing the inlet port 12.

The location and orientation of the infra-red temperature sensor 11 is such that during at least part of the induction cycle of the engine 10 it is able to sense the infra-red radiation emitted from the upper surface of the piston 17 and upper cylinder and hence provide an output signal 12 indicative of piston and upper cylinder temperature. The location of the sensor 11 in the inlet tract 16 enables the sensor 11 to be kept cool and clean by the passage thereby of the fuel-air mixture during the induction stroke. The output signal 12 is sent to an engine electronic control unit 25.

Because knock is accompanied by increased combustion chamber temperatures and in particular by a rapid increase in the temperature of the upper surface of the piston, the measurement of the piston 17 and upper cylinder temperatures is a direct indication of whether knock is occurring and the severity of the knock.

The electronic control unit 25 is a microprocessor based adaptive control system. Such control systems are well known see for example GB 2,186,997. The electronic control unit 25 also receives input signals 11, 13, 14 and 15 from respectively, an ambient temperature sensor 29, a manifold depression sensor 27, a piezo-crystal accelerometer 28 and a crankshaft transducer 26. The crankshaft transducer 26 supplies a signal indicating the rotational position and speed of the crankshaft 33 from which position and speed of the piston 17 can be calculated. Such crankshaft transducers are well known see for example GB 2,142,436.

The electronic control unit 25 sends an output control signal 01 to a fuel supply unit 21 and an output control signal 02 to a high voltage supply unit 24.

The high voltage supply unit 24 is operative to supply a high voltage to a spark plug 23 in response to the control signal 02 received from the electronic control unit 25. The fuel supply unit 21 is operative to draw fuel from a fuel tank 20 and to supply it to a fuel injector 22 in response to the control signal 01 received from the electronic control unit 25. In operation the electronic control unit 25 uses the input signals 11, 13 and 15 to predict from a look up map stored in the electronic control unit 25 the nominal optimum ignition and fuel admission timing.

The input signals 12 and 14 are then used to refine the predicted ignition and fuel admission timings by retarding these in accordance with a predetermined strategy stored in the electronic control unit 25 based upon the combined severity of the knock sensed by the temperature sensor 11 and the accelerometer 28.

I claim:

1. A spark ignited internal combustion engine having at least one inlet tract and a control system therefore, the control system comprising an engine electronic control unit, an optical knock sensor located in at least one inlet tract of the engine to sense, at least during part of the induction stroke, the radiation passing by an inlet valve means associated with that inlet tract and to supply a signal indicative of the sensed temperature to the electronic control unit and an ignition system including at least one spark plug, a high voltage supply unit to supply a high voltage to each spark plug in response to a control signal from the electronic control unit, and a crankshaft transducer means to supply signals indicative of the speed and rotational position of a crankshaft of the engine to the electronic control unit wherein the electronic control unit adjusts the ignition timing of the engine by varying the control signal in response to the signals received from the optical knock sensor and the crankshaft transducer means.

2. A spark ignited internal combustion engine as claimed in claim 1 in which the optical knock sensor is a ceramic pyroelectric infra-red temperature sensor.

3. A spark ignited internal combustion engine as claimed in claim 1 in which the temperature sensed is indicative of the surface temperature of the upper surface of a piston of the engine.

4. A spark ignited internal combustion engine as claimed in claim 1 in which the control system further comprises an accelerometer knock sensor which supplies a signal to the electronic control unit indicative of knock, the electronic control unit using this signal in combination with the signals from the optical knock sensor and the crankshaft transducer means to determine the adjustment of the ignition timing required.

5. A spark ignited internal combustion engine as claimed in claim 1 in which the engine is a multi-cylinder engine and every inlet tract has an optical knock sensor associated with it.

6. A spark ignited internal combustion engine comprising at least one cylinder, each of which has a reciprocable piston associated with it, at least one inlet tract for each cylinder, and at least one exhaust tract for each cylinder, each inlet tract being selectively connectable to its respective cylinder by inlet valve means, wherein at least one of the inlet tracts has located in it a knock sensor in the form of an infra-red temperature sensor positioned to sense, through an associated inlet port of that cylinder at least during part of the induction stroke of that cylinder of the engine, the temperature of the upper surface of the respective piston.

7. A spark ignited internal combustion engine as claimed in claim 6 in which each infra-red temperature sensor is a ceramic pyroelectric temperature sensor.

8. A spark ignited internal combustion engine as claimed in claim 6 in which the engine is a multi-cylinder engine and every inlet tract has an infra-red sensor located in it.

* * * * *